United States Patent
Kameda et al.

(10) Patent No.: US 10,065,275 B2
(45) Date of Patent: Sep. 4, 2018

(54) COMPONENT CRIMPING APPARATUS

(71) Applicant: PANASONIC INTELLECTUAL PROPERTY MANAGEMENT CO., LTD., Osaka (JP)

(72) Inventors: Akira Kameda, Yamanashi (JP); Shinjiro Tsuji, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 14/865,283

(22) Filed: Sep. 25, 2015

(65) Prior Publication Data

US 2016/0113164 A1     Apr. 21, 2016

(30) Foreign Application Priority Data

Oct. 20, 2014    (JP) .................................. 2014-213449

(51) Int. Cl.
*B23P 11/00*      (2006.01)
*H01R 43/20*      (2006.01)
*H01R 12/69*      (2011.01)

(52) U.S. Cl.
CPC .......... *B23P 11/005* (2013.01); *H01R 43/205* (2013.01); *H01R 12/69* (2013.01)

(58) Field of Classification Search
CPC ...... B23P 11/005; H01R 12/69; H01R 43/205
See application file for complete search history.

(56) References Cited

U.S. PATENT DOCUMENTS

| | | | | |
|---|---|---|---|---|
| 5,509,192 A | * | 4/1996 | Ota ..................... | H01R 43/205 29/703 |
| 5,682,675 A | * | 11/1997 | Hirota ................. | H01R 43/205 228/180.21 |
| 7,023,197 B2 | * | 4/2006 | Jung ................... | G01R 31/2887 324/757.01 |
| 7,220,922 B2 | * | 5/2007 | Nishino .............. | G02F 1/13452 174/260 |
| 7,464,807 B2 | * | 12/2008 | Ham .................. | G01R 31/2893 198/468.3 |
| 9,780,514 B2 | * | 10/2017 | Mimura .............. | H01R 43/048 |

(Continued)

FOREIGN PATENT DOCUMENTS

| | | |
|---|---|---|
| JP | 2000-077898 A | 3/2000 |
| JP | 2007-235178 A | 9/2007 |

(Continued)

*Primary Examiner* — Minh Trinh
(74) *Attorney, Agent, or Firm* — Pearne & Gordon LLP

(57) ABSTRACT

A component crimping apparatus includes a crimping tool that sucks a film-like component and presses a crimping section of the sucked film-like component against the substrate to crimp the film-like component to the substrate. The crimping tool includes a block holding portion that includes a guide member extending in one direction within a horizontal plane, first suction blocks that are provided movably along the guide member and that sucks an upper part of the crimping section of the film-like component, a second suction block that is provided movably along the guide member of the block holding portion and that sucks an upper part of a non-crimping section of the film-like component and a block fixation unit that fixes the first suction blocks and the second suction block to the guide member.

4 Claims, 9 Drawing Sheets

(56) References Cited

U.S. PATENT DOCUMENTS

| | | | | |
|---|---|---|---|---|
| 2011/0023296 A1* | 2/2011 | Muraoka | ............... | H01L 24/86 |
| | | | | 29/832 |
| 2015/0367618 A1* | 12/2015 | Kameda | ............. | B32B 37/0046 |
| | | | | 156/285 |
| 2016/0113164 A1* | 4/2016 | Kameda | ............... | B23P 11/005 |
| | | | | 29/743 |

FOREIGN PATENT DOCUMENTS

| | | |
|---|---|---|
| JP | 2011-100800 A | 5/2011 |
| JP | 2013-042070 A | 2/2013 |
| WO | 2006/118016 A1 | 11/2006 |

* cited by examiner

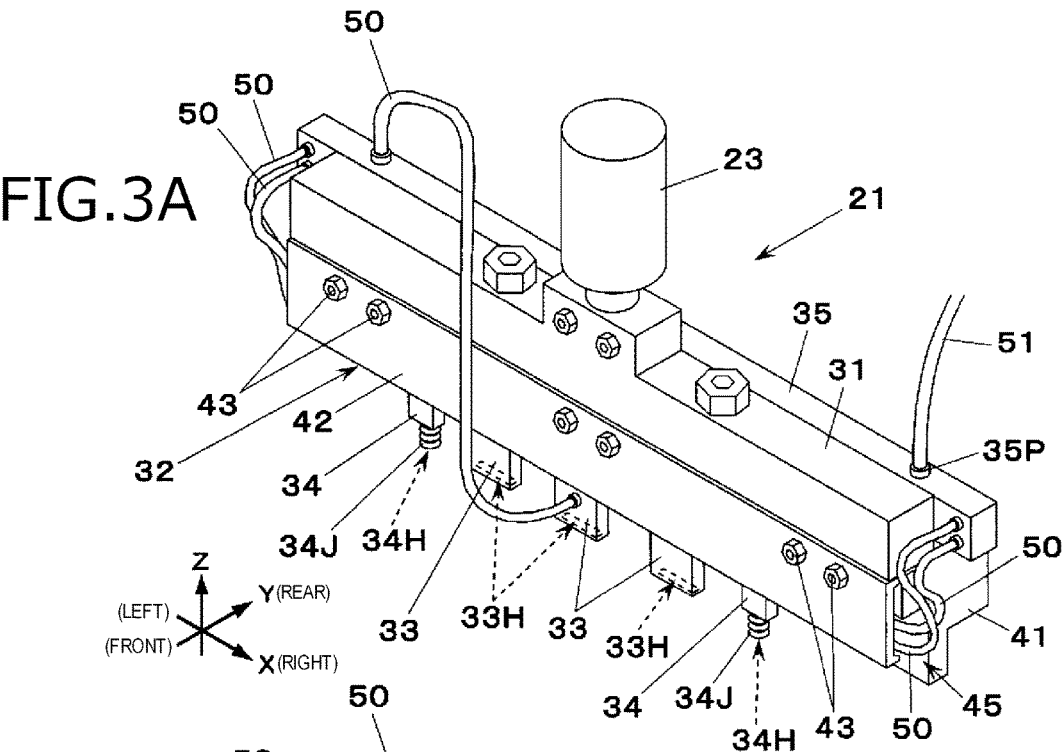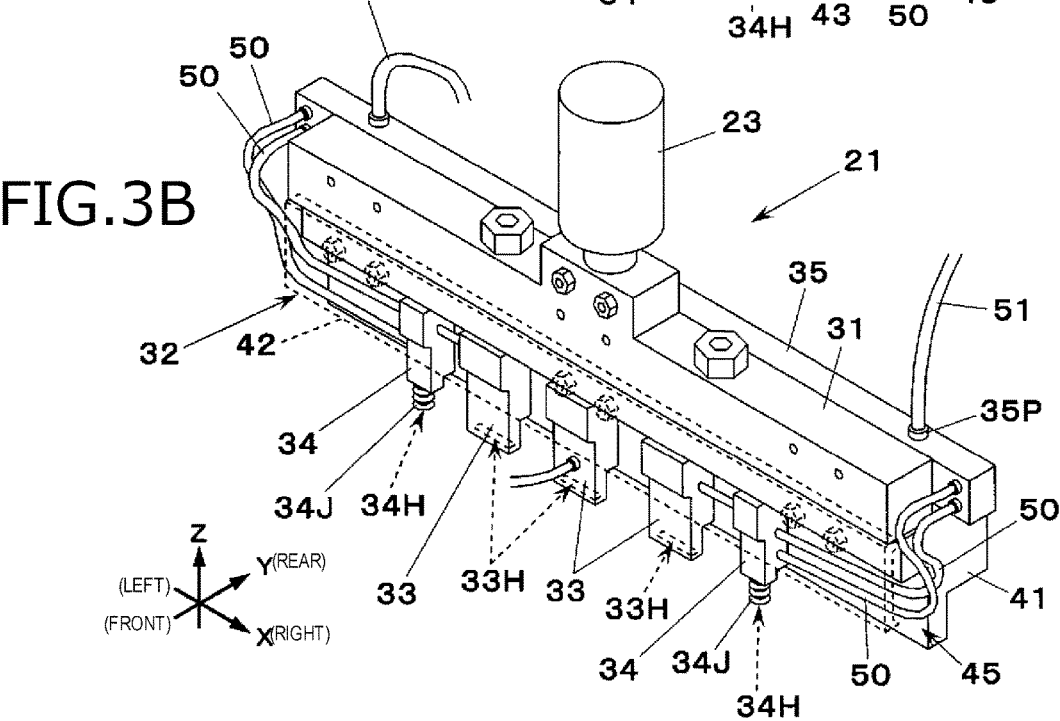

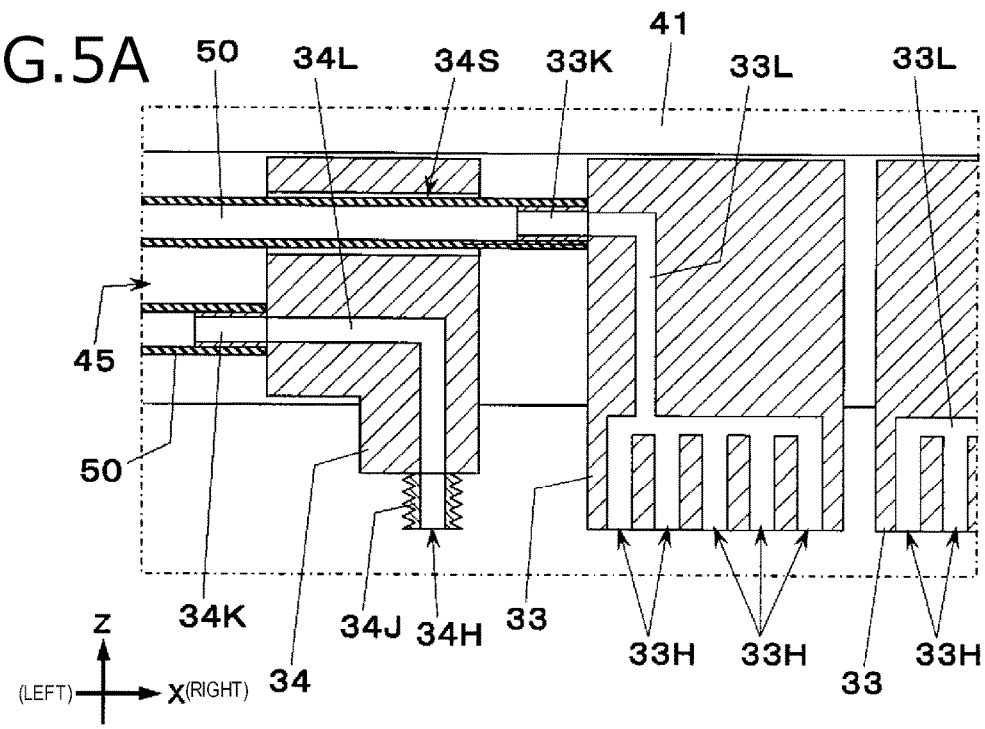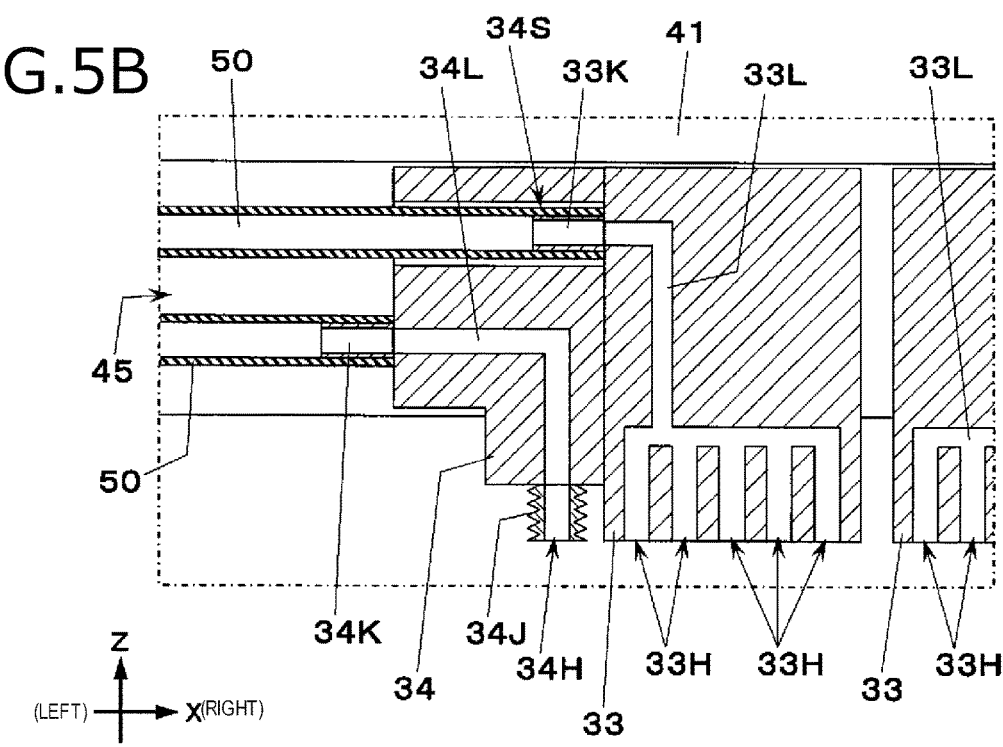

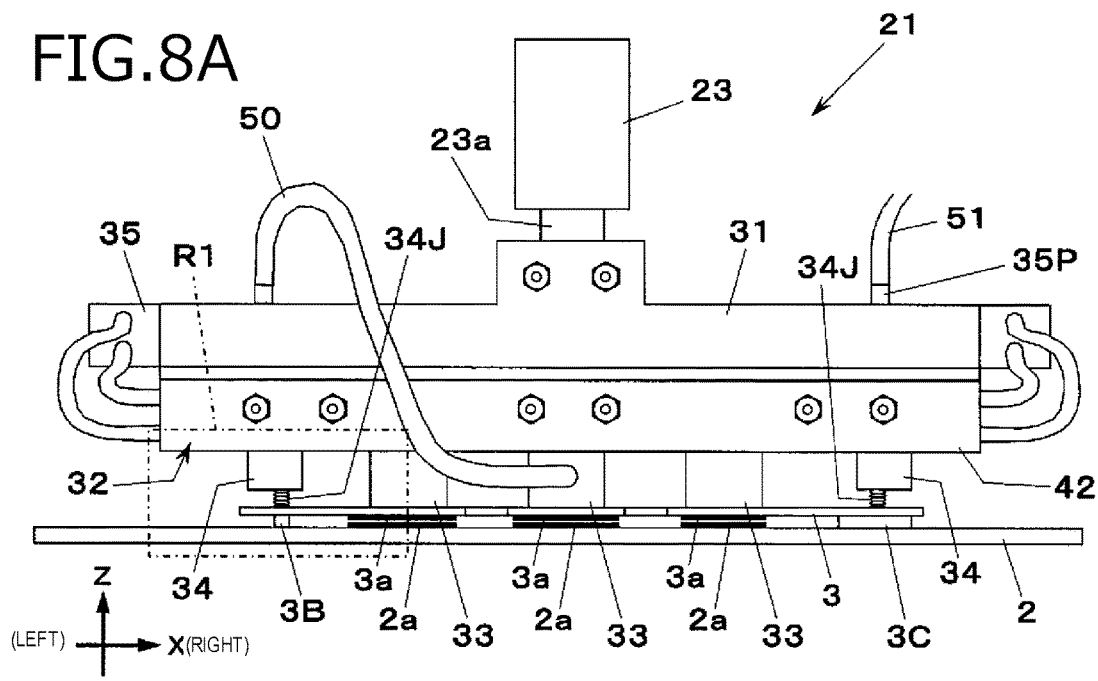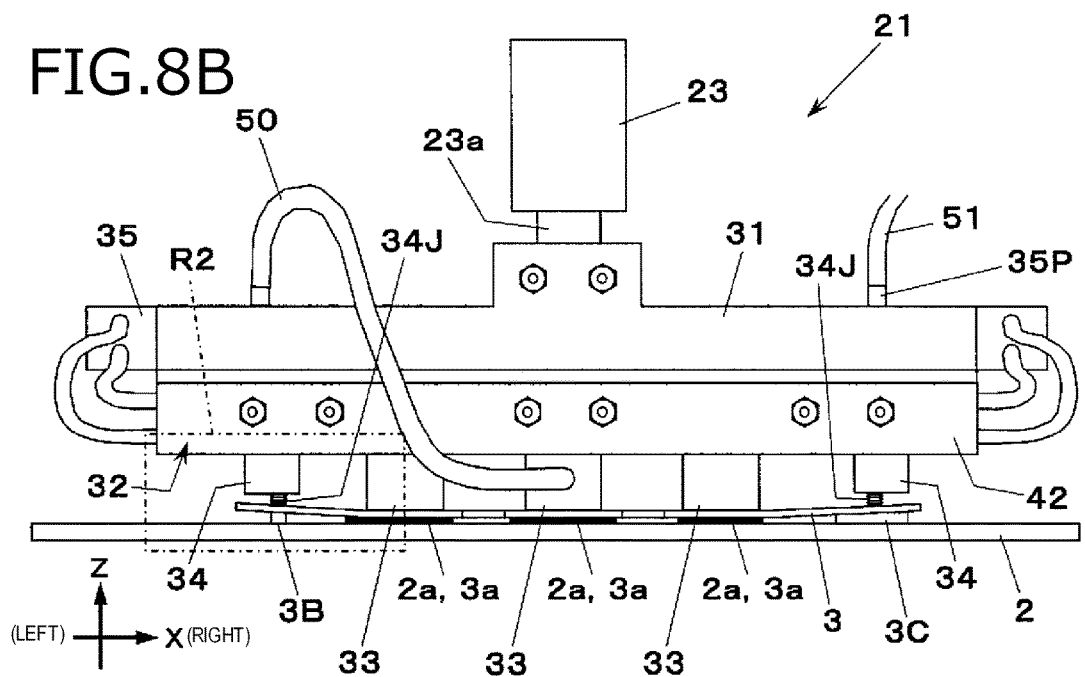

COMPONENT CRIMPING APPARATUS

CROSS REFERENCE TO RELATED APPLICATION

This application is based on Japanese Patent Application (No. 2014-213449) filed on Oct. 20, 2014, the contents of which are incorporated herein by reference.

BACKGROUND

1. Technical Field

The present invention relates to a component crimping apparatus which uses a crimping tool to suck a film-like component and crimp the sucked film-like component to a substrate.

2. Description of the Related Art

In the related art, there has been known a component crimping apparatus which uses a crimping tool to suck a film-like component and crimp the sucked film-like component to a substrate (e.g. the following WO 2006/118016 and JP-A-2013-42070). In the component crimping apparatus, when a film-like component is fed by a component feeding portion, the crimping tool sucks and picks up an upper part of a crimping section of the film-like component (mainly, a terminal of the film-like component) where the film-like component should be crimped to a substrate, and presses the picked-up crimping section of the film-like component against the substrate directly.

However, in the aforementioned component crimping apparatus according to the related art, of the film-like component, a part of a non-crimping section of the film-like component which is not sucked by the crimping tool (for example, the part of a non-crimping section is an end part of the film-like component) hangs down, and the hanging-down part of the film-like component may become an obstacle during crimping to impede normal crimping. Therefore, there is a problem that the aforementioned component crimping apparatus according to the related art may generate a defective substrate.

SUMMARY

To solve the foregoing problem, an object of the invention is to provide a component crimping apparatus which can reduce generation of a defective substrate caused by hanging down of a picked-up thin film component or film-like component.

The component crimping apparatus according to the invention is a component crimping apparatus which includes a crimping tool that sucks a film-like component and presses a crimping section of the sucked film-like component, where the film-like component is to be crimped to a substrate, against the substrate to crimp the film-like component to the substrate, wherein the crimping tool includes: a block holding portion that includes a guide member extending in one direction within a horizontal plane, first suction blocks that are provided movably along the guide member of the block holding portion and that sucks an upper part of the crimping section of the film-like component; a second suction block that is provided movably along the guide member of the block holding portion and that sucks an upper part of a non-crimping section of the film-like component, where the film-like component is not crimped to the substrate; and a block fixation unit that fixes the first suction blocks and the second suction block to the guide member.

According to the invention, it is possible to reduce generation of a defective substrate caused by hanging down of a picked-up film-like component.

BRIEF DESCRIPTION OF THE DRAWINGS

FIGS. 3A and 3B are perspective views of the crimping tool provided in the component crimping apparatus in the embodiment of the invention.

FIGS. 5A and 5B are partial enlarged sectional views of the crimping tool provided in the component crimping apparatus in the embodiment of the invention.

FIGS. 8A and 8B are explanatory views of the operation of the component crimping apparatus in the embodiment of the invention.

DETAILED DESCRIPTION OF THE EXEMPLARY EMBODIMENTS

Figure 1:
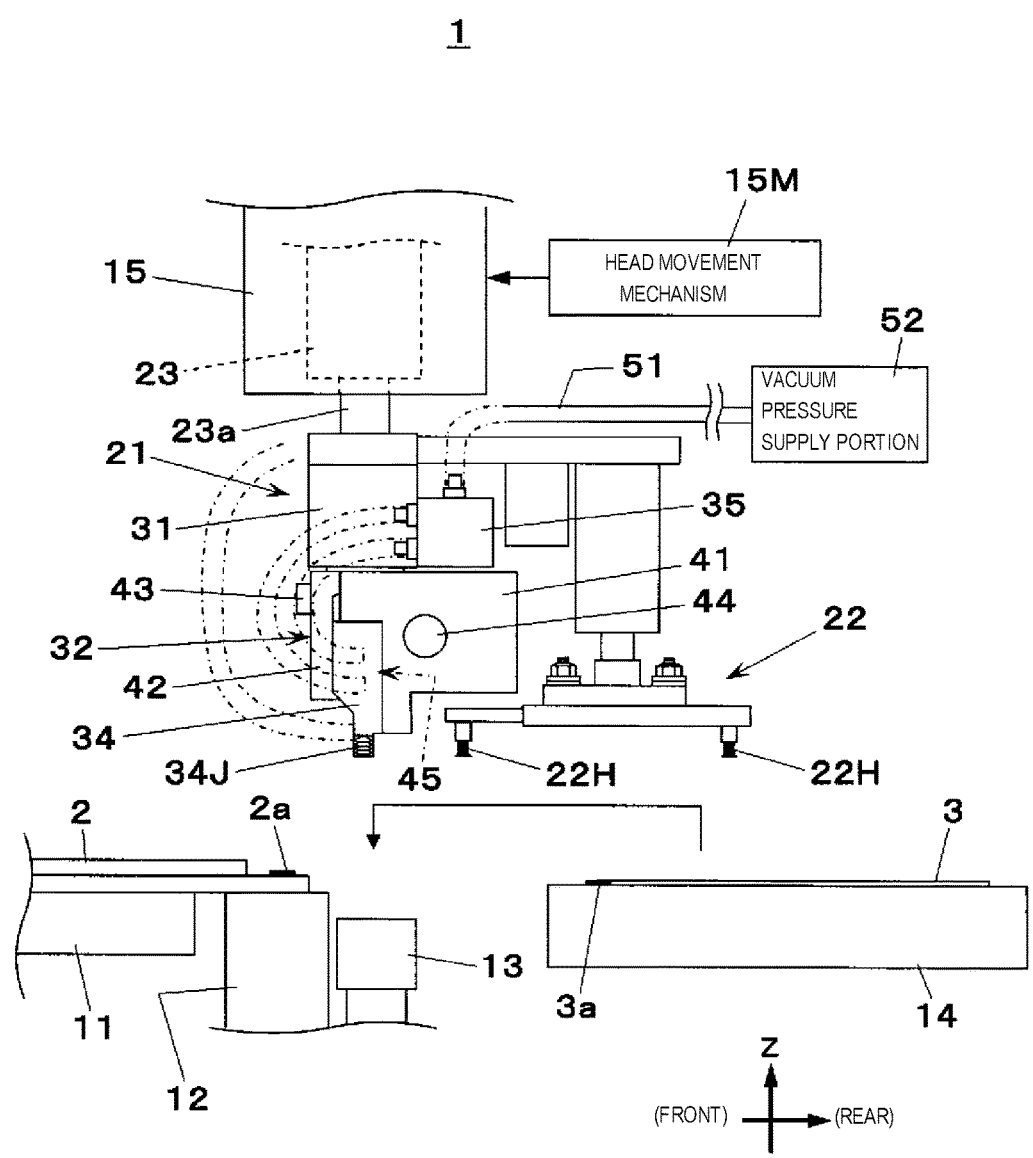
FIG. 1 is a side view of a component crimping apparatus in an embodiment of the invention.

An embodiment of the invention will be described below with reference to the drawings. A component crimping apparatus 1 illustrated in FIG. 1 is an apparatus for temporarily crimping a film-like component 3 to a substrate 2. The component crimping apparatus 1 places terminals 3a of the film-like component 3 on a plurality of electrode portions 2a provided in an edge portion of the substrate 2 so as to crimp the terminals 3a of the film-like component 3 to the electrode portions 2a of the substrate 2. Here, for convenience of explanation, a left/right direction (direction vertical to the paper plane of FIG. 1) seen from a not-illustrated operator will be designated as X-axis direction, a front/rear direction (left/right direction of the paper plane of FIG. 1) seen from the operator will be designated as Y-axis direction, and an up/down direction seen from the operator will be designated as Z-axis direction.

In FIG. 1, the component crimping apparatus 1 includes a substrate holding portion 11, a backup stage 12, a camera 13, a component feeding portion 14, and a crimping head 15. The substrate holding portion 11 holds a substrate 2. The backup stage 12 supports parts located under electrode portions 2a in a lower surface of the substrate 2 held by the substrate holding portion 11. The camera 13 is provided adjacently to the backup stage 12. The component feeding portion 14 feeds a film-like component 3. The crimping head 15 picks up the film-like component 3 fed by the component feeding portion 14.

In FIG. 1, the crimping head 15 is moved within a horizontal plane by a head movement mechanism 15M. The crimping head 15 lifts up/down a crimping tool 21 and an auxiliary tool 22 by a lifting cylinder 23.

Figure 2:
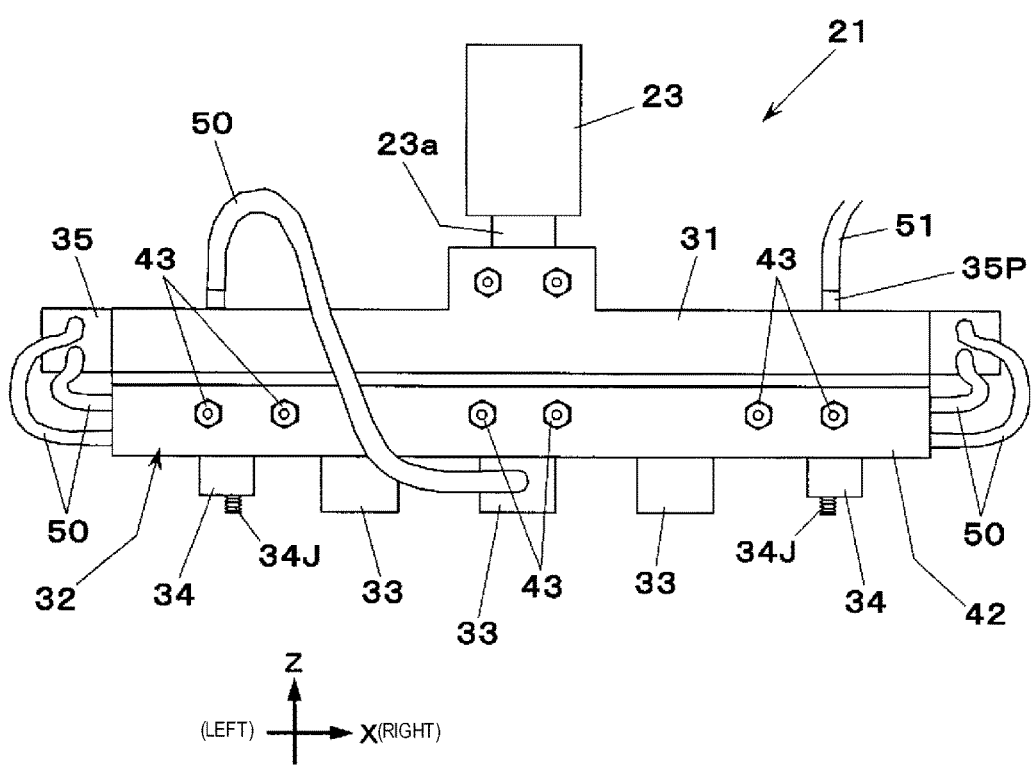
FIG. 2 is a front view of a crimping tool provided in the component crimping apparatus in the embodiment of the invention.

In FIG. 2 and FIGS. 3A and 3B, the crimping tool 21 has a shape extending in the X-axis direction as a whole. The crimping tool 21 includes a base member 31, a block holding portion 32, a plurality of (for example, three in this case) main suction blocks 33 (first suction blocks), two sub suction blocks 34 (second suction blocks), and a pipe member 35. The base member 31 is attached to a lower end of a piston rod 23a of the lifting cylinder 23. The block holding portion 32 is provided on a lower side part of the base member 31. The main suction blocks 33 and the two sub suction blocks 34 are held by the block holding portion 32. The pipe member 35 is provided on a rear side part of the base member 31.

In FIG. 1 and FIGS. 3A and 3B, the block holding portion 32 includes a back surface side member 41, a front surface side member 42, a plurality of fixation screws 43, and a heater 44. The back surface side member 41 is attached to the lower side part of the base member 31. The front surface side member 42 is disposed on a front surface of the back surface side member 41. The front surface side member 42 is detachably attached to the back surface side member 41 by the fixation screws 43. The heater 44 is built in the back surface side member 41. A guide member 45 extending in the X-axis direction and opened downward is provided between the front surface of the back surface side member 41 and a rear surface of the front surface side member 42.

The three main suction blocks 33 and the two sub suction blocks 34 are inserted into the guide member 45 of the block holding portion 32. Inside the guide member 45, the three main suction blocks 33 are disposed side by side in the X-axis direction, and the sub suction blocks 34 are disposed respectively on left and right outer sides of the row of the three main suction blocks 33. That is, the three main suction blocks 33 and the two sub suction blocks 34 are disposed side by side in a row in the X-axis direction inside the guide member 45. While upper half parts of the three main suction blocks 33 and upper half parts of the two sub suction blocks 34 are clamped by the back surface side member 41 and the front surface side member 42 in the Y-axis direction, lower half parts of the three main suction blocks 33 and lower half parts of the two sub suction blocks 34 protrude downward from the block holding portion 32 (FIG. 2, FIGS. 3A and 3B and FIG. 4).

When the fixation screws 43 are loosened in the state in which the upper half parts of the main suction blocks 33 and the upper half parts of the sub suction blocks 34 have been clamped by the back surface side member 41 and the front surface side member 42, the main suction blocks 33 and the sub suction blocks 34 are released from being clamped by the back surface side member 41 and the front surface side member 42. Accordingly, in this state, the main suction blocks 33 and the sub suction blocks 34 can be moved in the X-axis direction along the guide member 45. When the fixation screws 43 are fastened after the main suction blocks 33 and the sub suction blocks 34 have been moved to desired positions, the main suction blocks 33 and the sub suction blocks 34 can be clamped again by the back surface side member 41 and the front surface side member 42.

The block holding portion 32 includes the guide member 45 extending in one direction (the X-axis direction in this case) within the horizontal plane. The main suction blocks 33 and the sub suction blocks 34 can be moved along the guide member 45 in an extending direction of the guide member 45 respectively. The plurality of fixation screws 43 serve as block fixation units by which the main suction blocks 33 and the sub suction blocks 34 can be fixed to the desired positions inside the guide member 45.

Figure 4:
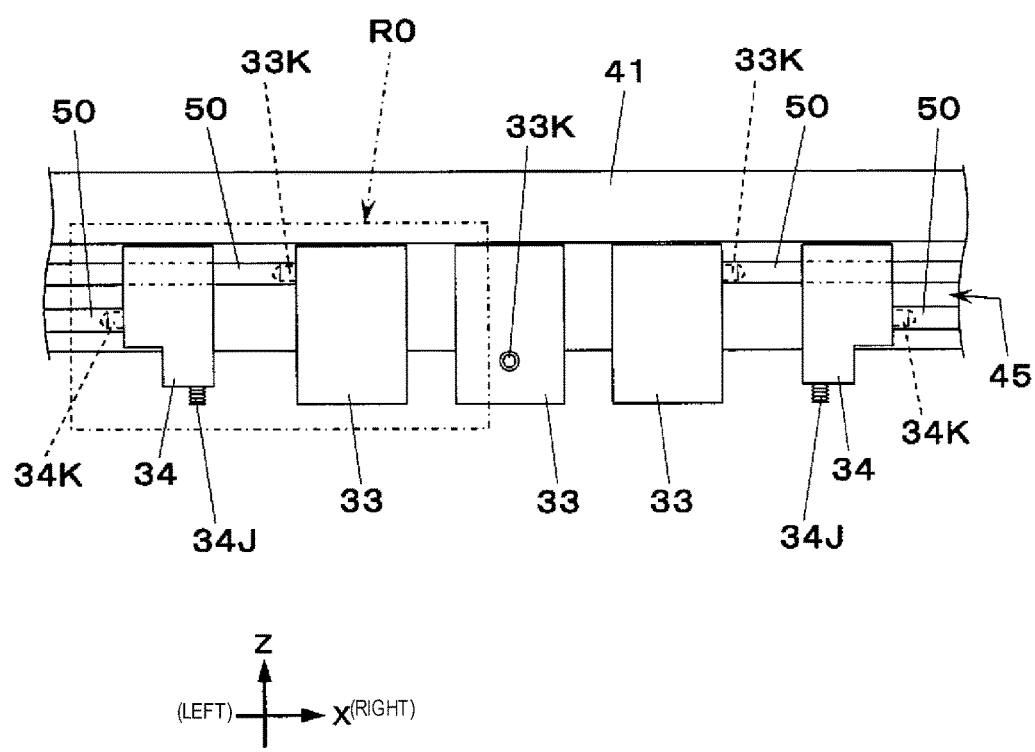
FIG. 4 is a partial front view of the crimping tool provided in the component crimping apparatus in the embodiment of the invention.

FIGS. 5A and 5B are enlarged sectional views of a region R0 illustrated in FIG. 4. In FIGS. 5A and 5B, each main suction block 33 contains an internal pipeline 33L. The internal pipeline 33L communicates with suction holes 33H at a lower end of the main suction block 33. The internal pipeline 33L of the main suction block 33 is opened in a front surface or a side surface of the main suction block 33 so that a pipe connector 33K can be connected to the internal pipeline 33L of the main suction block 33 (also see FIG. 4).

In FIGS. 5A and 5B, each sub suction block 34 contains an internal pipeline 34L. The internal pipeline 34L communicates with a suction hole 34H at a lower end of a pressing force absorption member 34J attached to a lower end of the sub suction block 34. In the embodiment, the pressing force absorption member 34J is formed by a hollow bellows-like member. The internal pipeline 34L of the sub suction block 34 is opened in a side surface of the sub suction block 34 so that a pipe connector 34K can be connected to the internal pipeline 34L of the sub suction block 34 (FIG. 4).

In FIGS. 3A and 3B, one ends of vacuum pipes 50 for supply of vacuum pressure are connected to the pipe connector 33K of the main suction block 33 and the pipe connector 34K of the sub suction block 34 respectively. The other ends of the vacuum pipes 50 are connected to the pipe member 35. An internal pipe (not-illustrated) which makes communicate with the vacuum pipes 50 extending from the main suction block 33 and the sub suction block 34 is provided inside the pipe member 35. A vacuum pressure supply port 35P for supplying vacuum pressure to the internal pipe is provided on an upper surface side part of the pipe member 35. The vacuum pressure supply port 35P is connected to a vacuum pressure supply portion 52 by a vacuum pressure supply channel 51 (FIG. 1).

In FIGS. 3A and 3B and FIGS. 5A and 5B, the vacuum pipes 50 attached to the pipe connectors 34K of the sub suction blocks 34 extend outwards respectively from left and right end portions of the block holding portion 32. The vacuum pipes 50 attached to the pipe connectors 33K of the left and right main suction blocks 33 extend inside sleeves 34S (or simply inside through passages) which are provided to penetrate the adjacent sub suction blocks 34 in the X-axis direction, and further extend outward from the left and right end portions of the block holding portion 32. Here, axes of the sleeves 34S provided in the sub suction blocks 34 are aligned with axes of the pipe connectors 33K of the main suction blocks 33 located in the left and right. Therefore, when the main suction blocks 33 located in the left and right and the sub suction blocks 34 adjacent thereto are relatively moved in the X-axis direction, the vacuum pipes 50 attached to the left and right main suction blocks 33 move axially inside the sleeves 34S provided in the sub suction blocks 34. FIG. 5B illustrates a state in which the left and right main suction blocks 33 and the sub suction blocks 34 have been brought into contact with each other.

When vacuum pressure is supplied from the vacuum pressure supply portion 52, the vacuum pressure is fed to the internal pipelines 33L of the main suction blocks 33 and the internal pipelines 34L of the sub suction blocks 34 through the vacuum pressure supply channel 51, the internal pipe of the pipe member 35 and the respective vacuum pipes 50 so that suction force can be generated in the suction holes 34H of the main suction blocks 33 and the suction holes 34H of the sub suction blocks 34. Each of the main suction blocks 33 and the sub suction blocks 34 can be selectively removed from the bock holding portion 32. As described above, the main suction blocks 33 and the sub suction blocks 34 have respective independent vacuum pressure supply paths. Even when any of the main suction blocks 33 and the sub suction blocks 34 is removed from the block holding portion 32, there is no influence on the other vacuum feed paths. Therefore, the crimping tool 21 can be used in the state in which any unnecessary one of the main suction blocks 33 and the sub suction blocks 34 has been removed from the block holding portion 32 correspondingly to the shape and size of a film-like component 3 to be handled.

In FIG. 1, the auxiliary tool 22 includes a plurality of suction portions 22H protruding downwards. These suction portions 22H are connected to the aforementioned vacuum pressure supply portion 52 by a not-illustrated vacuum pipe. Similarly to the suction holes 33H of the main suction blocks 33 and the suction holes 34H of the sub suction blocks 34 provided in the crimping tool 21, suction force can be also generated in the respective suction portions 22H of the auxiliary tool 22.

When a film-like component 3 is crimped (temporarily crimped) to a substrate 2 by the crimping head 15, the crimping head 15 first sucks and picks up the film-like component 3 from the component feeding portion 14. In order to crimp the film-like component 3, the crimp tool 21 uses the main suction blocks 33 to suck upper parts of terminals 3a (i.e. upper parts Ra of crimping sections where the film-like component 3 should be crimped to the substrate 2) provided in the film-like component 3. Simultaneously with this, the crimping tool 21 uses the two sub suction blocks 34 to suck upper parts of opposite left and right end portions of the row of the terminals 3a (i.e. upper parts Rb of non-crimping sections where the film-like component 3 should not be crimped to the substrate 2). Further, the auxiliary tool 22 uses the plurality of suction portions 22H to suck parts of the film-like component 3 behind the terminals 3a in the Y-axis direction. In this manner, the operator can position the main suction blocks 33, the sub suction blocks 34, and the auxiliary tool 22 in advance correspondingly to the shape and size of the film-like component 3 so that the main suction blocks 33, the sub suction blocks 34, and the auxiliary tool 22 can suck proper parts of the film-like component 3 respectively.

Figure 6A:
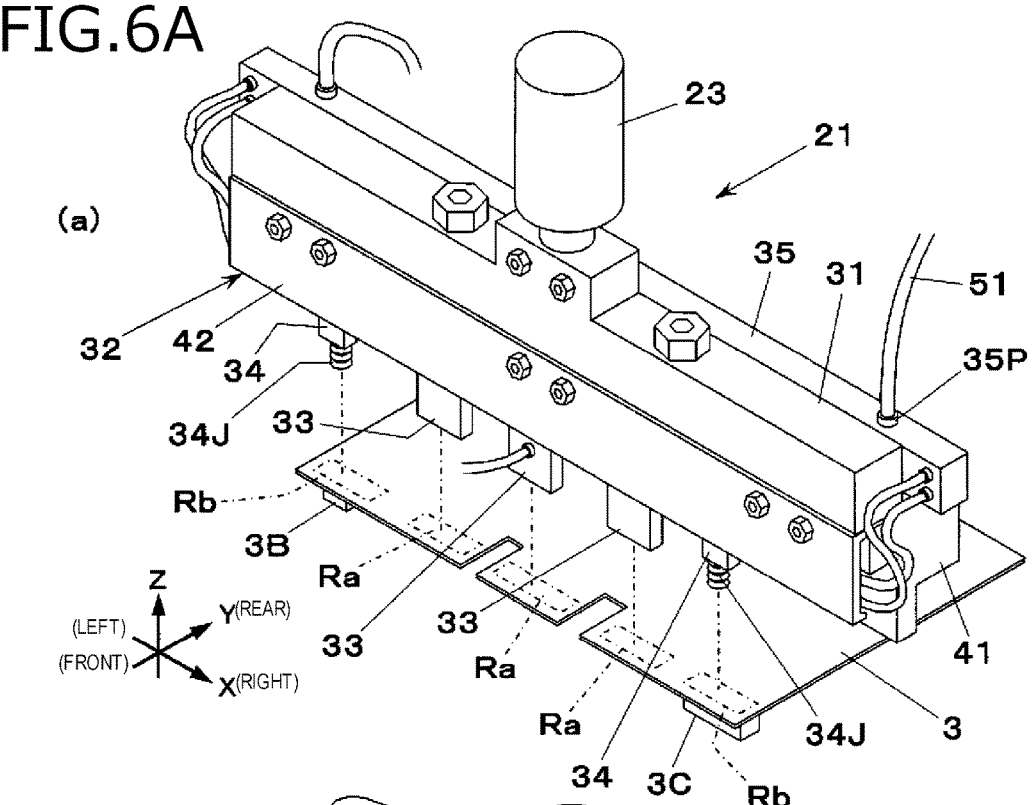
FIGS. 6A and 6B are perspective views of the crimping tool together with a film-like component provided in the component crimping apparatus in the embodiment of the invention.
Figure 6B:
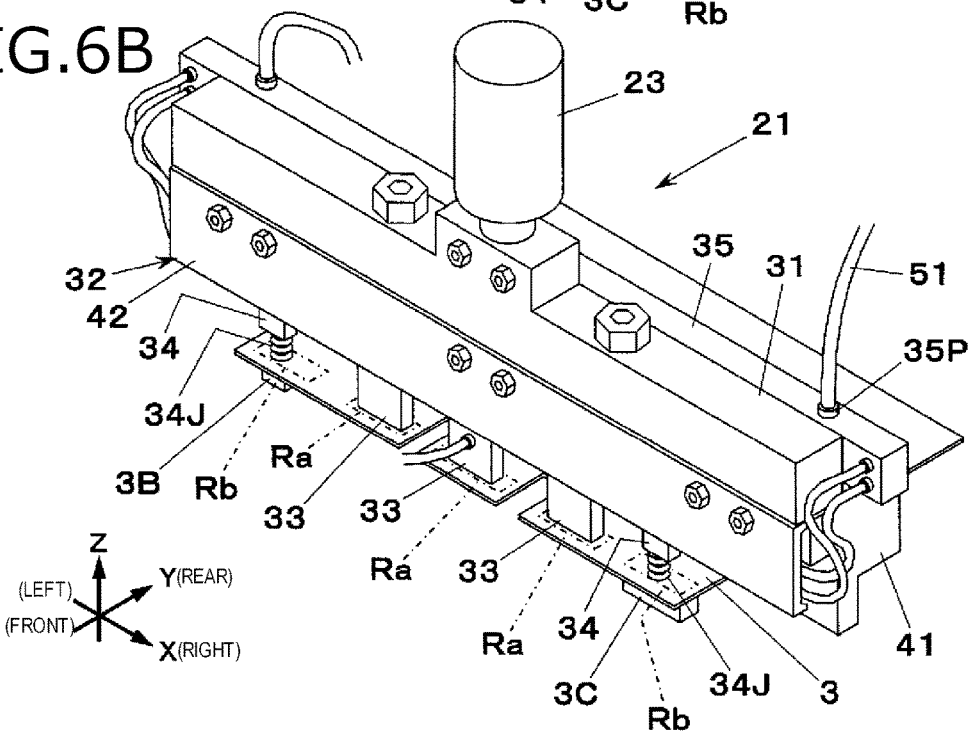

FIGS. 6A and 6B illustrate an example in which the film-like component 3 has a functional component 3B located on one end side of the opposite left and right ends of the row of the terminals 3a, and a connector 3C located on the other end side thereof. In this case, the upper parts Ra of the crimping sections of the film-like component 3, where the film-like component 3 should be crimped to the substrate 2, are sucked by the three main suction blocks 33 and the upper parts Rb of the non-crimping sections (an upper part of the functional component 3B and an upper part of the connector 3C) where the film-like component 3 should not be crimped to the substrate 2 are sucked by the two sub suction blocks 34. In this manner, not only the upper parts Ra of the crimping sections to be crimped to the substrate 2 but also the upper parts Rb of the non-crimping sections can be sucked by the crimping tool 21. Accordingly, of the film-like component 3 picked up by the crimping tool 21, the non-crimping sections positioned in the left and right of the crimping sections do not hang down but the whole of the row of the crimping sections of the film-like component 3 can be kept at a horizontal posture. In addition, in the embodiment, the parts of the film-like component 3 behind the crimping sections are also sucked by the auxiliary tool 22. Accordingly, the whole of the film-like component 3 can be kept at a horizontal posture.

Figure 7A:
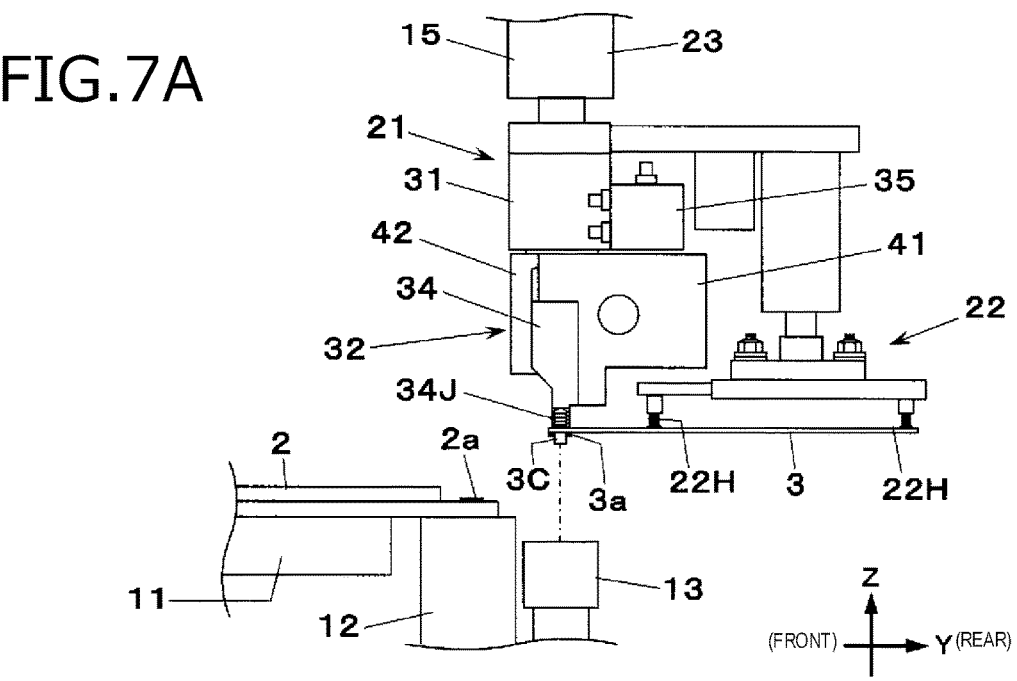
FIGS. 7A and 7B are explanatory views of operation of the component crimping apparatus in the embodiment of the invention.
Figure 7B:
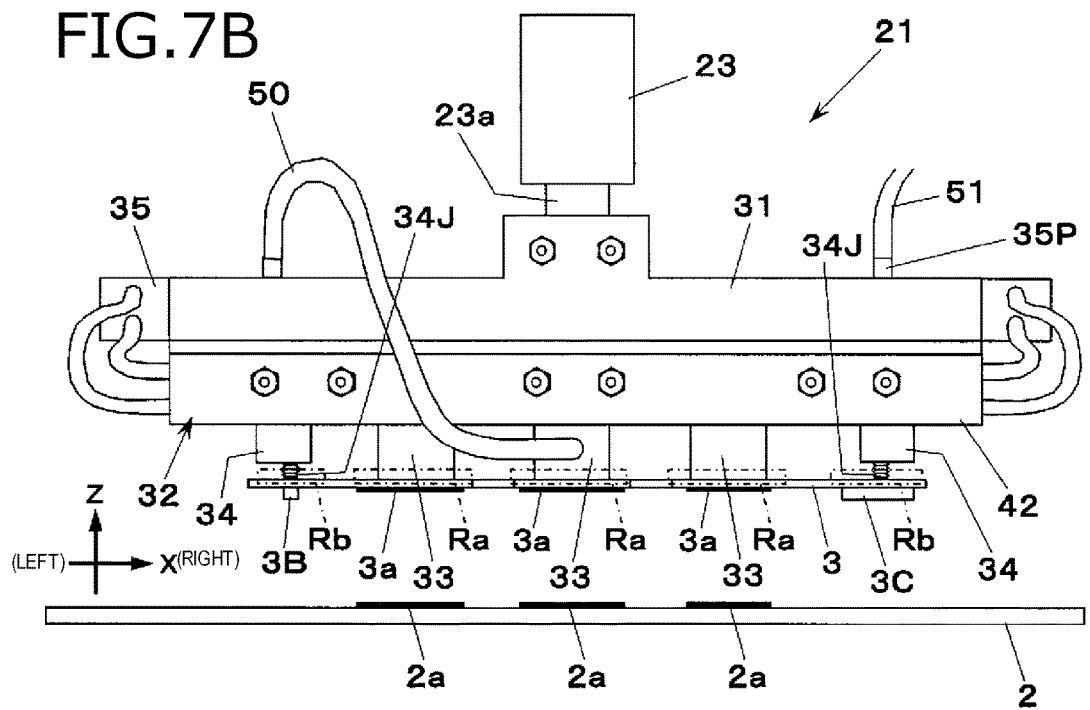

When the film-like component 3 is sucked by the crimping tool 21 and the auxiliary tool 22, the crimping head 15 moves to position the terminals 3a of the lower surface of the film-like component 3 above the camera 13. The camera 13 images the terminals 3a of the film-like component 3 one by one from below (FIG. 7A) and recognizes the positions of the terminals 3a. Next, the crimping head 15 moves based on results of the recognition performed by the camera 13 to thereby position the terminals 3a of the film-like component 3 above corresponding electrode portions 2a of the substrate 2 (FIG. 7B). When the lifting cylinder 23 lifts down the crimping tool 21 to push down the crimping tool 21 so as to place the terminals 3a of the film-like component 3 on the electrode portions 2a of the substrate 2 (FIG. 7B→FIG. 8A→FIG. 8B), the heater 44 heats the main suction blocks 33. Thus, while the film-like component 3 is pressed against the substrate 2, a tape-like adhesive material pasted in advance to the electrode portions 2a of the substrate 2 is thermally cured. Accordingly, the terminals 3a of the film-like component 3 and the electrode portions 2a of the substrate 2 are firmly bonded to each other so that the film-like component 3 is crimped to the substrate 2.

The film-like component 3 can be crimped to the substrate 2 in this manner. Not only the upper parts Ra of the crimping sections but also the upper parts Rb of the non-crimping sections in the left and right end portions of the upper parts Ra of the crimping sections in the film-like component 3, are sucked by the crimping tool 21. Accordingly, parts (particularly, end parts) of the film-like component 3 can be prevented from hanging down. Therefore, there never occurs such a situation that hanging-down parts of the film-like component 3 become obstacles to impede normal crimping in a crimping step of the film-like component 3.

Figure 9A:
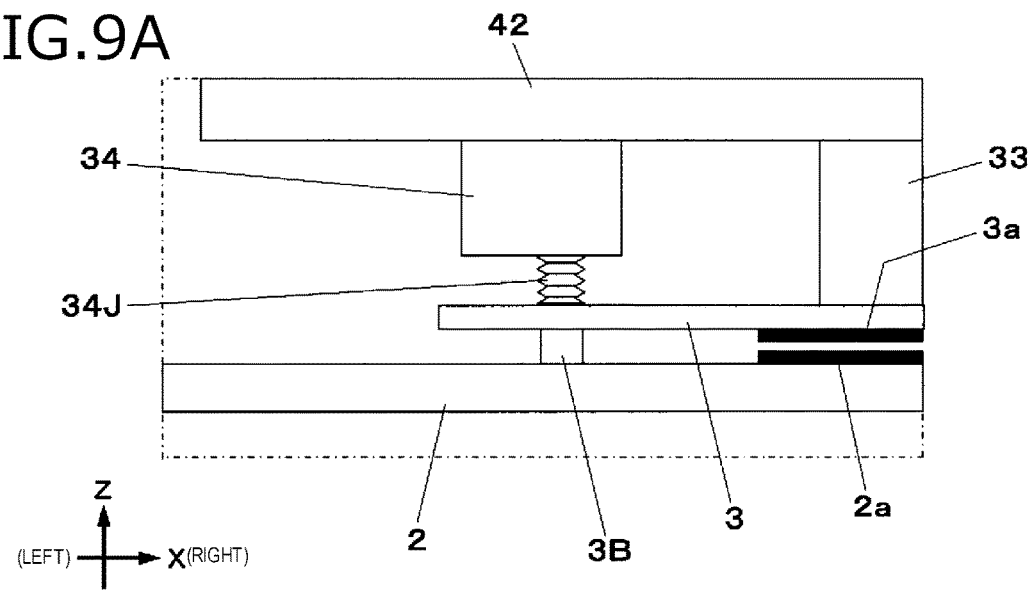
FIGS. 9A and 9B are partial enlarged views of the component crimping apparatus in the embodiment of the invention.
Figure 9B:
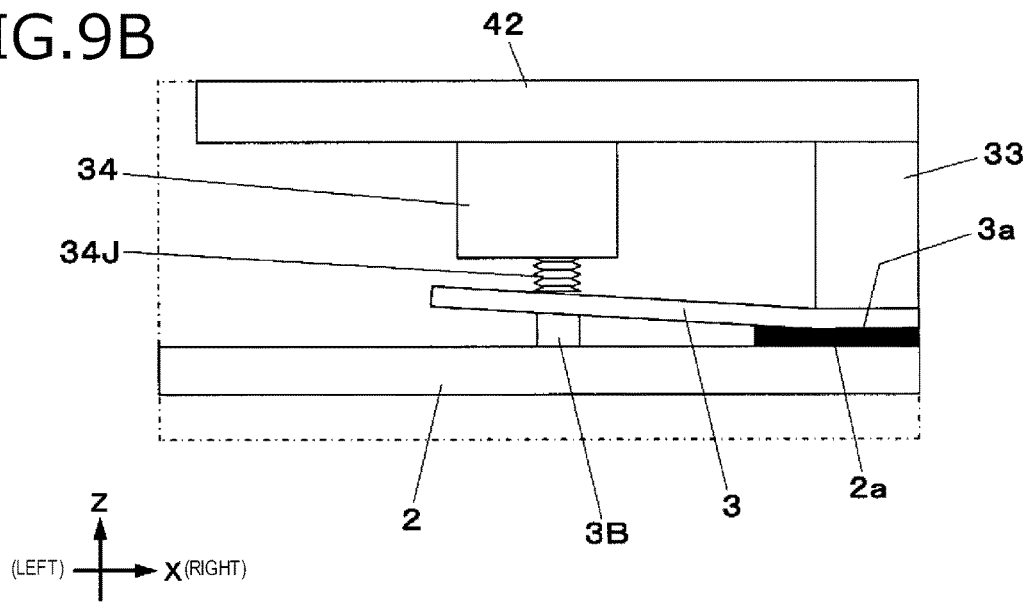

FIG. 9A is an enlarged view of a region R1 illustrated in FIG. 8A. FIG. 9B is an enlarged view of a region R2 illustrated in FIG. 8B. In the embodiment, when the film-like component 3 is pressed against the substrate 2 by the crimping tool 21 (FIG. 9A→FIG. 9B), the pressing force absorption members 34J are pressed and contracted so that pressing force with which the crimping tool 21 is pressing these components (the functional component 3B and the connector 3C) against the substrate 2 can be absorbed by the pressing force absorption members 34J (FIG. 9B). Therefore, the functional component 3B or the connector 3C which should avoid being pressed against the substrate 2 can be prevented from being pressed against the substrate 2 when the film-like component 3 is crimped. Accordingly, it is possible to prevent a situation which may cause damage to these components.

As described above, according to the component crimping apparatus 1 in the embodiment, the upper parts Ra of the crimping sections of the film-like component 3 are sucked by the main suction blocks 33 (first suction blocks) and the upper parts Rb of the non-crimping sections of the film-like component 3 where the film-like component 3 should not be crimped to the substrate 2 are sucked by the sub suction blocks 34 (second suction blocks). Thus, the film-like component 3 can be picked up without causing to hang down in the end parts of the row of the crimping sections. Therefore, it is possible to reduce generation of a defective substrate caused by the hanging down of the film-like component 3.

Although the pressing force absorption members 34J provided at the lower ends of the sub suction blocks 34 (second suction blocks) are shaped like bellows in the embodiment, it may go well as long as the pressing force absorption members 34J can be elastically deformed in a direction in which the film-like component 3 is pressed against the substrate 2. Accordingly, each of pressing force absorption members 34J does not always have to have a bellows shape. For example, the pressing force absorption member 34J may be formed into a cylinder pipe made of rubber.

In the aforementioned embodiment, the sub suction blocks 34 serving as the second suction blocks are provided respectively on the opposite left and right sides of the row of the main suction blocks 33 serving as the first suction blocks. This is for the purpose of preventing the opposite left and right ends of the crimping sections of the film-like component 3 from hanging down. Accordingly, the sub suction block 34 may be provided only on one of the left and right sides of the row of the main suction blocks 33 according to the shape of the film-like component 3 etc. In addition, the positions of the sub suction blocks 34 relative to the main suction blocks 33 may be set desirably and the number of the sub suction blocks 34 is not limited to two. The sub suction blocks 34 may be disposed among the main suction blocks 33 according to the shape of the film-like component 3 etc.

It is possible to provide a component crimping apparatus which can reduce generation of a defective substrate caused by hanging down of a picked-up film-like component.

What is claimed is:

1. A component crimping apparatus comprising:
   a crimping tool including a crimping head configured to suck a thin film component and press a crimping section of the thin film component, where the thin film component is to be crimped to a substrate, against the substrate to crimp the thin film component to the substrate,
   the crimping head coupled to the crimping tool and configured to move the crimping tool downward to press the thin film component against the substrate so that the thin film component is crimped to the substrate,
   wherein the crimping tool further comprises:
   a block holding portion comprising a guide member extending in one direction within a horizontal plane;
   first suction blocks configured to move along the guide member of the block holding portion and suck an upper part of the crimping section of the thin film component;
   a second suction block configured to move along the guide member of the block holding portion and suck an upper part of a non-crimping section of the thin film component, where the thin film component is not crimped to the substrate; and
   a block fixation unit configured to fix the first suction blocks and the second suction block to the guide member; and
   a pressing force absorption member which is elastically deformed in a direction in which the thin film component is pressed against the substrate,
   wherein the pressing force absorption member is attached to a lower end of the second suction block.

2. The component crimping apparatus according to claim 1, wherein the second suction block is positioned outside a row of the first suction blocks where the first suction blocks are aligned in a line.

3. The component crimping apparatus according to claim 1,
   wherein the second suction block is configured to suck the upper part of the non-crimping section of the thin film component through the pressing force absorption member.

4. The component crimping apparatus according to claim 1, wherein the pressing force absorption member is a hollow bellow member attached to a lower end of the second suction block.

* * * * *